United States Patent
Rieck et al.

[11] Patent Number: 5,974,773
[45] Date of Patent: Nov. 2, 1999

[54] CROP DIVIDER FOR THE WHEEL OF AN AGRICULTURAL MACHINE

[76] Inventors: Ryan William Rieck, Box 146; Lindsay Duane Nerbas, Box 63, both of MacNutt, Canada, S0A 2K0

[21] Appl. No.: 09/018,885

[22] Filed: Feb. 5, 1998

[30]     Foreign Application Priority Data

Nov. 5, 1996 [CA] Canada ................................. 2189592

[51] Int. Cl.⁶ ................................................. A01D 63/04
[52] U.S. Cl. .............................. 56/314; 56/320; 172/833; 37/263
[58] Field of Search ............................... 56/1, 15.7, 15.8, 56/218, 228, DIG. 3, DIG. 10, DIG. 14, DIG. 20, DIG. 24, 314, 319, 320; 172/833; 37/263

[56]            References Cited

U.S. PATENT DOCUMENTS

| 2,591,522 | 4/1952 | DeJoy | 172/833 |
|---|---|---|---|
| 2,635,516 | 4/1953 | Patterson | 172/833 |
| 3,967,439 | 7/1976 | Mott | 56/314 |
| 5,802,746 | 9/1998 | Miller | 37/263 |
| 5,852,727 | 12/1998 | Fox | 56/DIG. 24 |

*Primary Examiner*—H. Shackelford
*Attorney, Agent, or Firm*—A. Battison; M. Thrift

[57]            ABSTRACT

This invention is a mounting system which provides impact protection for crop dividers or row dividers mounted on crop sprayers or harvesters and the like. A divider extends forwardly and downwardly and terminates with a ground engageable shoe. The ground engageable shoe rotates downwardly about a generally horizontal axis relative to the rest of the crop divider assembly. The ground engageable shoe is retained in operating position by gravity and a unique and simple link system. Upon engaging an obstruction the ground engageable shoe rotates downwardly about its axis of rotation thereby activating the link system which lifts the entire divider and ground engageable shoe clear of the obstruction.

12 Claims, 3 Drawing Sheets

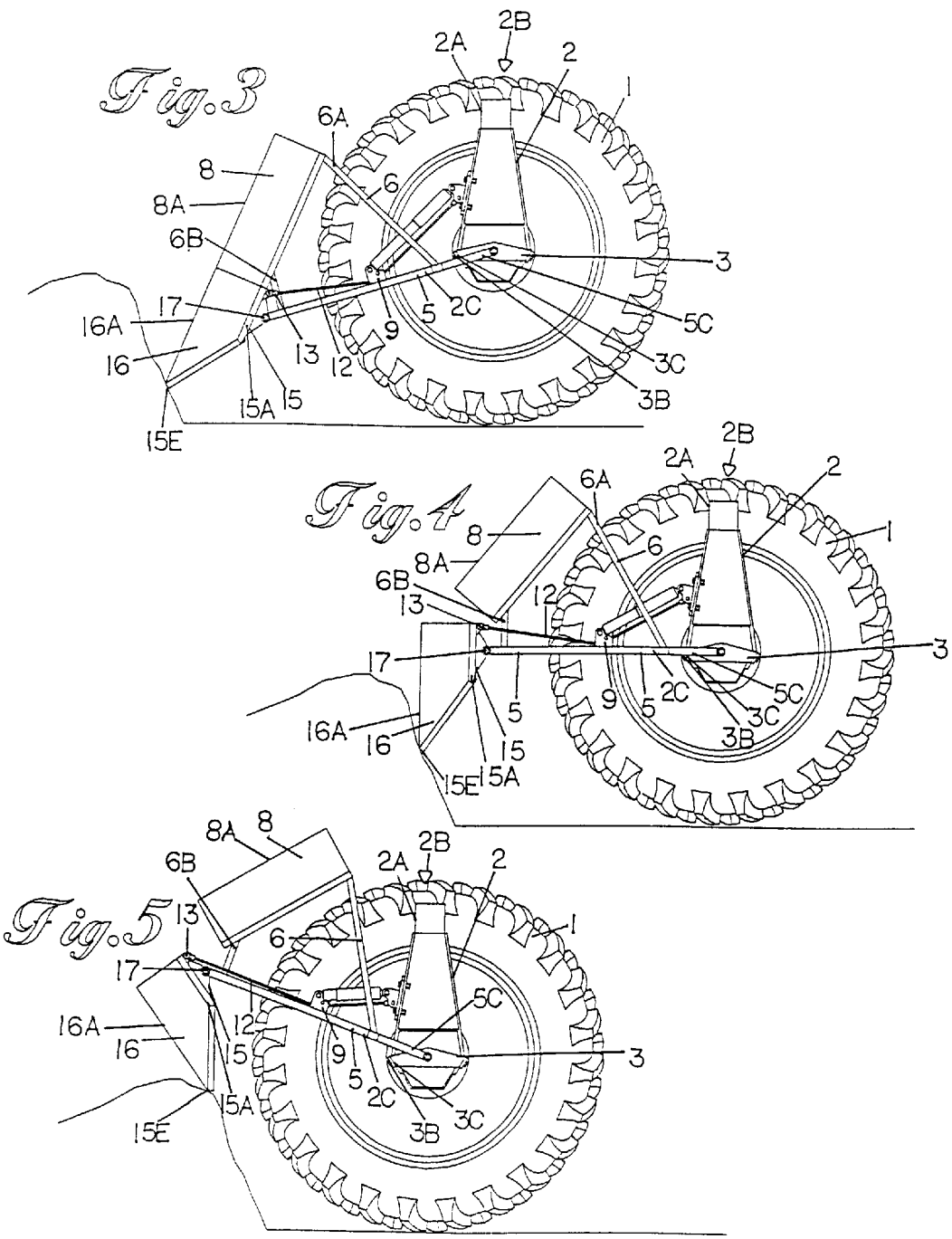

CROP DIVIDER FOR THE WHEEL OF AN AGRICULTURAL MACHINE

FIELD OF THE INVENTION

The instant invention relates to a crop divider for mounting at the wheel of an agricultural vehicle such as a corn harvester, crop sprayer and the like. More particularly the invention relates to a relief mechanism for the crop divider which is responsive to impact forces with obstacles to raise the crop divider away from the obstacle.

BACKGROUND OF THE INVENTION

Typically a crop divider mounted rigidly on a crop sprayer when encountering an obstruction will be damaged from the resulting forces. In many cases the rigidity of the mounting system will allow the resultant forces of impact to be transmitted to the frame of the machine on which the divider is mounted causing extensive damage to both machine and crop divider. Various methods of impact protection in a crop divider and its mounting system have previously been proposed. However none have the combined ability to clear relatively large obstacles, to gently follow a contoured surface and to tolerate a large load from the continual engagement with the crop in heavy crop conditions and at high speeds.

SUMMARY OF THE INVENTION

It is one object of the present invention to provided a crop divider with a trip arrangement allowing the divider to lift on engagement with an obstacle.

According to the invention there is provided a crop divider, for use on a vehicle having a frame and a wheel, comprising:

a mounting frame arranged for mounting on the vehicle frame forwardly of the wheel for pivotal movement about a first axis which is generally horizontal and transverse to the wheel so as to allow upward movement of the mounting frame relative to the wheel from a first operating position to a second raised position;

a divider shield mounted on the mounting frame so as to be positioned forwardly of the wheel to divide the crop to respective sides of the wheel;

a ground engageable shoe mounted on the mounting frame for pivotal movement relative thereto about a second axis substantially parallel to the first axis, the ground engaging shoe being mounted on the mounting frame at a position thereon for impacting an obstacle in advance of the mounting frame and for pivoting relative to the mounting frame in response to said impacting;

an actuation member having a first end attached to the ground engageable shoe and a second end arranged for attachment to the vehicle frame and arranged such that rotation of the ground engageable shoe about its mounting axis in response to said impacting causes the mounting frame to rotate about its mounting axis from its operating position toward said raised position.

Preferably the divider shield is fixed on the mounting frame for movement therewith.

Preferably there is provided an adjustment member for adjusting a length of the actuation member.

Preferably the actuation member comprises a flexible cable.

Preferably there is provided a cable guide arranged to increase the ratio of the rotation of the shoe relative to the rotation of the mounting frame.

Preferably a shock absorber is mounted so as to dampen the rotation of the mounting frame relative to the vehicle frame.

Preferably the shoe is arranged for pivotal movement in a direction opposite to that of the mounting frame.

Preferably the actuation member comprises a flexible cable attached to the shoe above the second axis such that rotation of the shoe in a direction rearwardly and downwardly causes pulling of the cable.

Preferably the second end of the cable is arranged for attachment to the frame at a position thereon above the mounting frame for pulling the mounting frame upwardly.

Preferably the cable engages around a guide on the mounting frame forwardly of the first axis and rearwardly of the shoe.

Preferably the shoe includes a divider shield portion mounted thereon which forms, in the operating position, an extension of the divider shield of the mounting frame.

Preferably the divider shield and the divider shield portion form a divider line which is inclined forwardly and downwardly to a forward apex on the shoe for engaging an obstacle.

The embodiments of the invention as shown and described hereinafter also may provide the advantages that the crop divider mounting system will allow the crop divider to effectively follow a contoured surface such as a drainage ditch or washout, that it will provide impact protection in the event of collision between the crop divider and an obstruction such as a rock or mole hill and that it will withstand the forces encountered when travelling at high speeds through heavy crop conditions without activating the contour following or impact relief features until they are required.

BRIEF DESCRIPTION OF THE DRAWINGS

One embodiment of the invention will now be described in conjunction with the accompanying drawings in which:

FIGS. 3, 4 and, 5 illustrate the operation of the mounting system in collision with an obstruction.

In the drawings like characters of reference indicate corresponding parts in the different figures.

DETAILED DESCRIPTION

Figure 1:
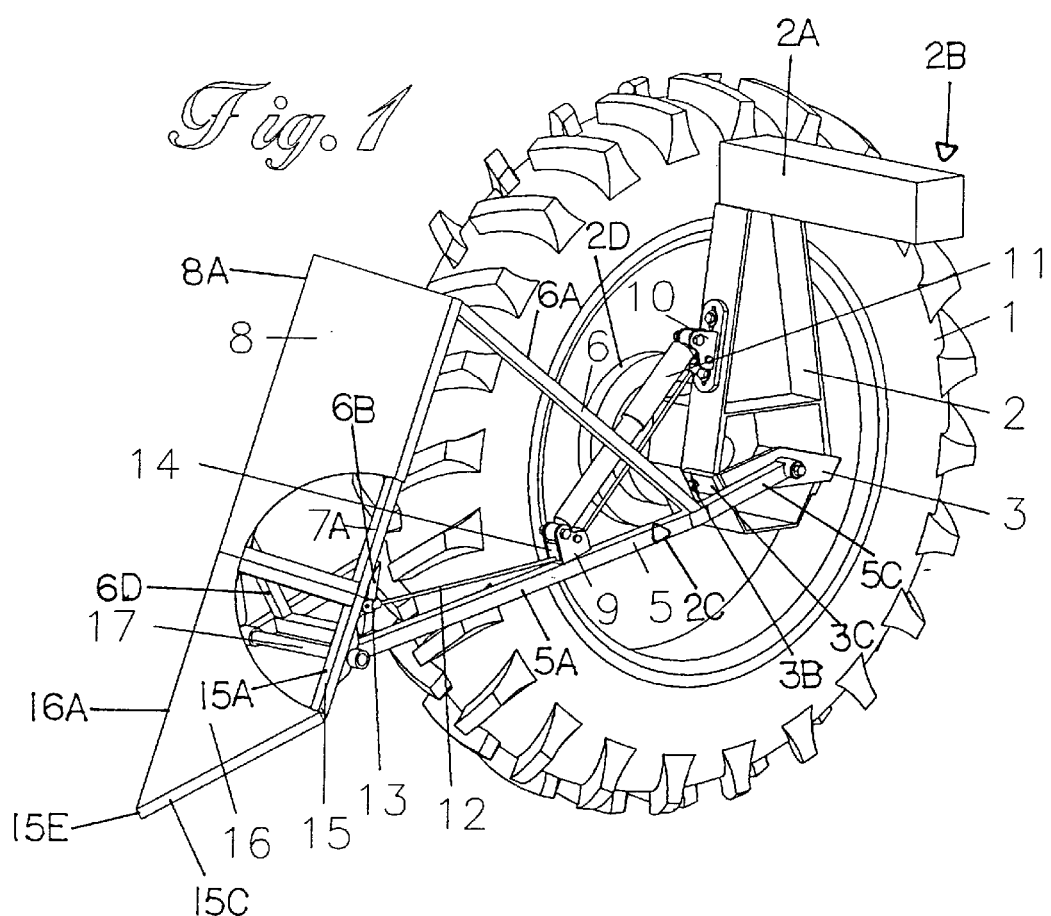
FIG. 1 is an isometric view of one side of the crop divider assembly.
Figure 2:
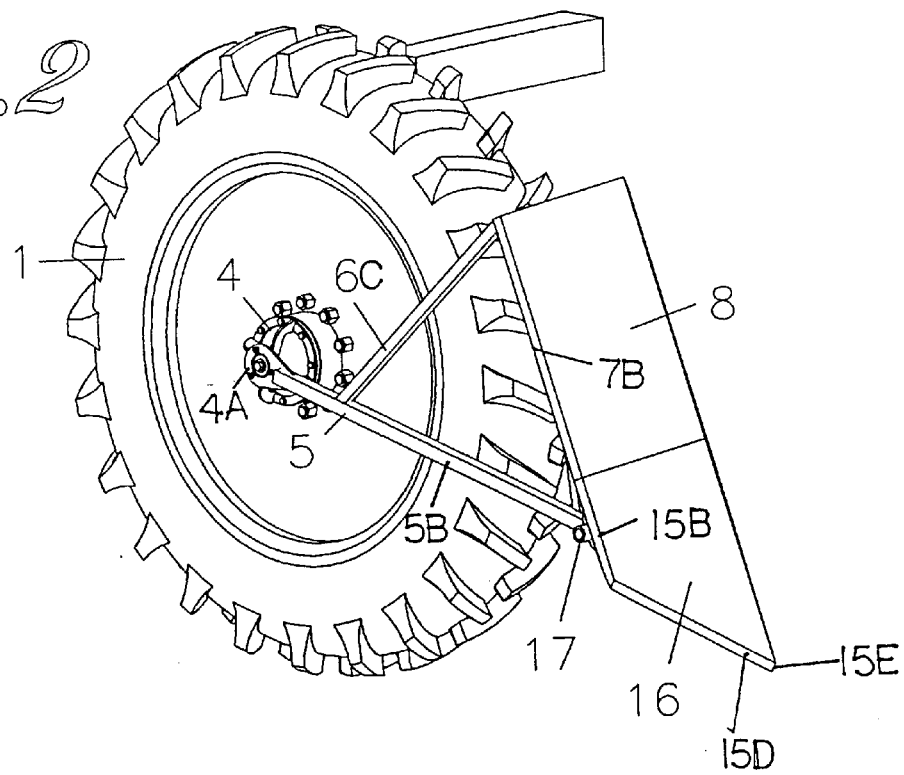
FIG. 2 is an isometric view of the second side of the crop divider assembly.

FIGS. 1 and 2 show an axle 2A and a drop box 2 assembly attached at the end of the axle of a vehicle 2B. The vehicle is of the type used as a self propelled sprayer and the details of the vehicle are not shown as these are well known to one skilled in the art from those used on several brands of self propelled sprayers currently available on the market. The vehicle has shown only those elements relevant to the present invention including a wheel 1 mounted on a wheel hub 2C carried at the lower end of the drop box 2. The wheel hub includes an inner portion 2D projecting outwardly from the drop box for attachment to the wheel plate.

A mounting frame 5 is arranged to surround the forward portion of the wheel 1. The mounting frame 5 includes an inner rail 5A and an outer rail 5B which extend forwardly from the wheel hub to a position in front of the wheel. The rear end 5C of the inner rail 5A frame 5 is supported at the first inner side of the wheel 1 by stud mounting bracket plate 3 connected across the drop box 2 and a lubricated bushing 3A projecting at right angles to the bracket plate inwardly relative to the wheel. The stud mounting bracket plate 3 is bolted to the drop box 2 by right angle flanges 3B and bolts 3C.

The outer rail 5B of the mounting frame 5 is fastened at the second outer side of the wheel 1 by a ball bearing 4A carried on mounting pin of a stud cage assembly 4. The stud cage assembly 4 in the form of a spider is fastened to the wheel hub using the wheel bolts. The stud mounting bushing 3A and the ball bearing 4A of the stud cage assembly 4 are oriented so as to allow the mounting frame 5 to rotate about the axis of rotation of the wheel causing the forward end to move upwardly and downwardly relative to the wheel.

The mounting frame 5 has fastened to it four posts 6A, 6B on the inner rail 5A and 6C, 6D on the outer rail 5B. The posts are inclined forwardly and upwardly and attach to side rails 7A and 7B of a divider frame 7. The posts 6A and 6C attach to the rear ends of the rails 7A and 7B respectively and the posts 6B and 6D attach to the forward ends of the rails. The rails are inclined forwardly and downwardly from the rear end at a raised position above the rails 5A and 5B to a lower front end.

The mounting frame 5 has also fastened to it a shock absorber mounting bracket 9 positioned part way along the inner rail 5A. A second shock absorber mounting bracket 10 is fastened to the drop box 2. A shock absorber 11 is fastened at its ends to the first and second shock absorber mounting brackets 9, 10 and is thus inclined upwardly and rearwardly to resist upward loads on the frame 5 caused by impact with an obstacle.

Across the front ends of the inner and outer rails 5A and 5B of the frame 5 is attached a pin and bushing assembly 17 defining a horizontal axis parallel to and spaced forwardly of the wheel axis. A ground engageable shoe frame 15 is mounted on the forward end of the mounting frame 5 by the pin and bushing assembly 17 for rotation about the horizontal axis. The ground engageable shoe frame 15 comprises two side rails 15A and 15B which are spaced by the same distance as the rails 7A and 7B of the divider frame so as to form a continuation thereof. At the front of the rails 15A and 15B is provided a pair of front rails 15C and 15D converging to an apex 15E spaced downwardly and forwardly of the pin 17. The rails 15A and 15B are mounted on the pin by brackets 17A so that the upper end of the rails 15A and 15B are above the axis of the pin 17.

The shoe frame is able to rotate upwardly and downwardly about the horizontal axis. Upward rotation of the ground engageable shoe frame 15 is limited at an upper position thereof by contact with the lower portion of the divider frame 7. Downward movement from the upper position moves the shoe frame away from the divider frame.

A cable 12 on the inner side of the divider fame extends from the upper end of the shoe frame above the axis to the drop box of the vehicle. The shoe frame 15 is normally held in the raised operating position by tension in the cable 12.

The cable 12 has its first end fastened to the shoe frame using a clevis, pin, and clevis tab assembly 13. The cable has its second end fastened to the shock absorber mounting bracket 10 in a like fashion. The path of the cable travels through a cable guide 14 mounted in the lower shock absorber mounting bracket 9. Gravity pulls the entire crop divider assembly downwardly thereby tensioning the cable 12 and limiting the downward rotation of the entire crop divider assembly. The length of the cable 12 may be adjusted thereby adjusting the operating height of the crop divider assembly relative to the ground.

A thin shield 16 is fastened to the ground engageable shoe frame 15 using rivets or screws. A second thin shield 8 is fastened to the divider frame 7 also using rivets or screws. Both shields converge upwardly and inwardly from the side rails to define a leading edge 16A, 8A which is collinear with the apex 15E along the center of the divider assembly in front of the wheel.

The ground engageable shoe frame 15, divider frame 7 and, mounting frame 5 are constructed of suitable tubular material such as steel. The ground engageable shoe shield 16 and divider shield 8 are constructed of suitable sheet material such as fiberglass, plastic, or steel. A material known in the industry as UHMW (Ultra High Molecular Weight) plastic is used for the cable guide 14. The shock absorber 11 is of the gas type common in the automotive industry having characteristics which allow for a small damping force in compression relative to its damping force in tension.

In operation as shown in FIGS. 3, 4 and 5, the apex 15E of the shoe frame 15 is supported at a distance above the ground determined by the adjustment of the cable and the apex 15E and the divider line 16A separate the stems of the crop while the line 8A of the divider assembly guides the stems around the wheel 1. This prevents the crop from being trampled to the ground by the wheel 1 where it cannot be harvested in a conventional fashion.

In the event of a collision between the apex 15E of the ground engageable shoe 15 and a solid object such as a rock, the resulting force will cause the shoe 15 to pivot downwardly and rearwardly about the axis of the pin 17. This buckling action causes additional tension in the cable 12 thereby causing the mounting frame 5 to pivot about its axis of rotation at the wheel axis and lift the entire crop divider assembly clear of the obstruction. The previously mentioned characteristics of the gas type shock absorber 11 allow the crop divider assembly to rotate upwardly about its axis of rotation without large counteracting damping forces. The damping forces of the shock absorber 11 in extension will cause the crop divider assembly to gently return to its operating position after a collision.

The apex 15E of the shoe frame 15, throughout its range of motion, remains the lowest point of the divider assemble and therefore is the most likely point of contact with any obstruction in its path thereby eliminating any position of vulnerability. It is this characteristic that allows the crop divider assembly to follow a contoured surface such as a drainage ditch while still performing the desired function of dividing the crop.

As the crop being divided travels upwardly and rearwardly over the ground engageable shoe shield 16 a forces is applied to the divider assembly which is rearward and downward. The downward force works with gravity and increases the tension in the cable 12 thereby increasing the horizontal force required to activate the tripping action of the mounting system. This allows the crop divider assembly to withstand the forces generated when travelling at high speeds through heavy crop conditions while maintaining a correct operating position.

The crop divider can also operate as a fender to prevent mud from being thrown by the wheel onto the vehicle. In this arrangement, the length of the shield is increased and when used as a fender the shield is pivoted upwardly and rearwardly to a raised position without tripping the buckling effect. The device is therefore of dual purpose since the requirement for a mud fender occurs in a situation where the field is bare of crop so that no crop dividing effect is required.

Although the instant invention has been described with reference to preferred embodiments, workers skilled in the art will recognize that changes may be made in form and detail without departing from the spirit and scope of the invention.

We claim:

1. In a vehicle having a frame and a wheel, a crop divider comprising:
   a mounting frame mounted on the vehicle frame forwardly of the wheel for pivotal movement about a first axis which is generally horizontal and transverse to the wheel so as to allow upward movement of the mounting frame relative to the wheel from a first operating position to a second raised position;
   a divider shield member mounted on the mounting frame so as to be positioned forwardly of the wheel to divide the crop to respective sides of the wheel;
   a ground engageable shoe forming a member of the divider shield member mounted on the mounting frame for pivotal movement relative thereto about a second axis substantially parallel to the first axis, the ground engageable shoe being mounted on the mounting frame at a position thereon for impacting an obstacle in advance of the mounting frame and for pivoting relative to the mounting frame in response to said impacting;
   an actuation member having a first end attached to the ground engageable shoe and a second end attached to the vehicle frame and arranged such that rotation of the ground engageable shoe about its mounting axis in response to said impacting causes the mounting frame to rotate about its mounting axis from its operating position toward said raised position.

2. The crop divider according to claim 1 wherein the divider shield member is fixed on the mounting frame for movement therewith.

3. The crop divider according to claim 1 wherein there is provided an adjustment member for adjusting a length of the actuation member.

4. The crop divider according to claim 1 wherein the actuation member comprises a flexible cable.

5. The crop divider according to claim 4 wherein there is provided a cable guide arranged to increase the ratio of the rotation of the shoe relative to the rotation of the mounting frame.

6. The crop divider according to claim 1 wherein a shock absorber is mounted so as to dampen the rotation of the mounting frame relative to the vehicle frame.

7. The crop divider according to claim 1 wherein the shoe is arranged for pivotal movement in a direction opposite to that of the mounting frame.

8. The crop divider according to claim 7 wherein the actuation member comprises a flexible cable attached to the shoe above the second axis such that rotation of the shoe in a direction rearwardly and downwardly causes pulling of the cable.

9. The crop divider according to claim 8 wherein the second end of the cable is arranged for attachment to the frame at a position thereon above the mounting frame for pulling the mounting frame upwardly.

10. The crop divider according to claim 9 wherein the cable engages around a guide on the mounting frame forwardly of the first axis and rearwardly of the shoe.

11. The crop divider according to claim 1 wherein the shoe includes a divider shield portion mounted thereon which forms, in the operating position, an extension of the divider shield member of the mounting frame.

12. The crop divider according to claim 11 wherein the divider shield member and the divider shield portion form a divider line which is inclined forwardly and downwardly to a forward apex on the shoe for engaging an obstacle.

* * * * *